Figure 1:
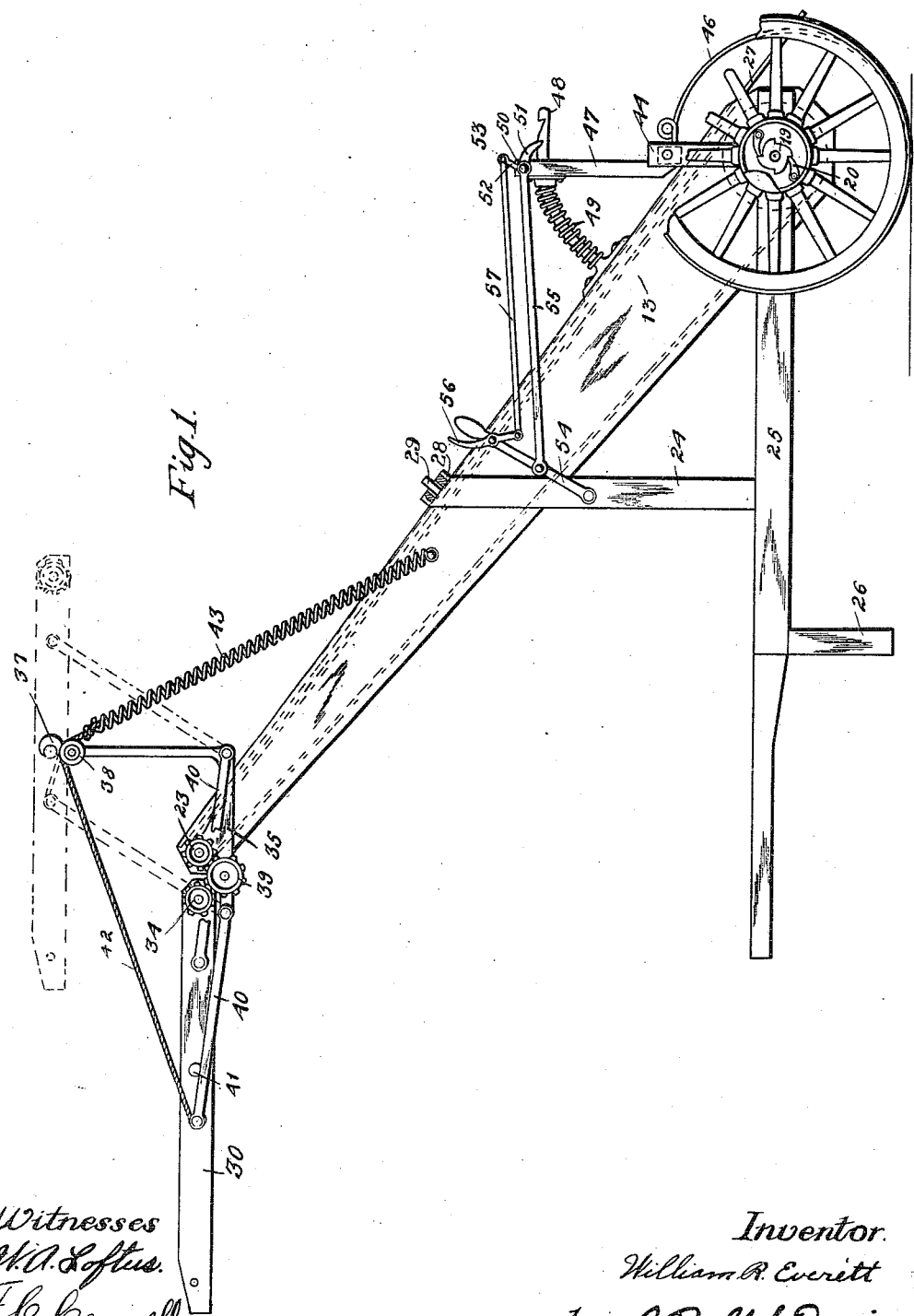

W. R. EVERITT.
CONVEYER DEVICE FOR HAY RAKES AND LOADERS.
APPLICATION FILED FEB. 14, 1910.

973,418.

Patented Oct. 18, 1910.

2 SHEETS—SHEET 1.

Witnesses
W. A. Loftus.
F. C. Caswell

Inventor.
William R. Everitt
by J. Ralph Onig
atty.

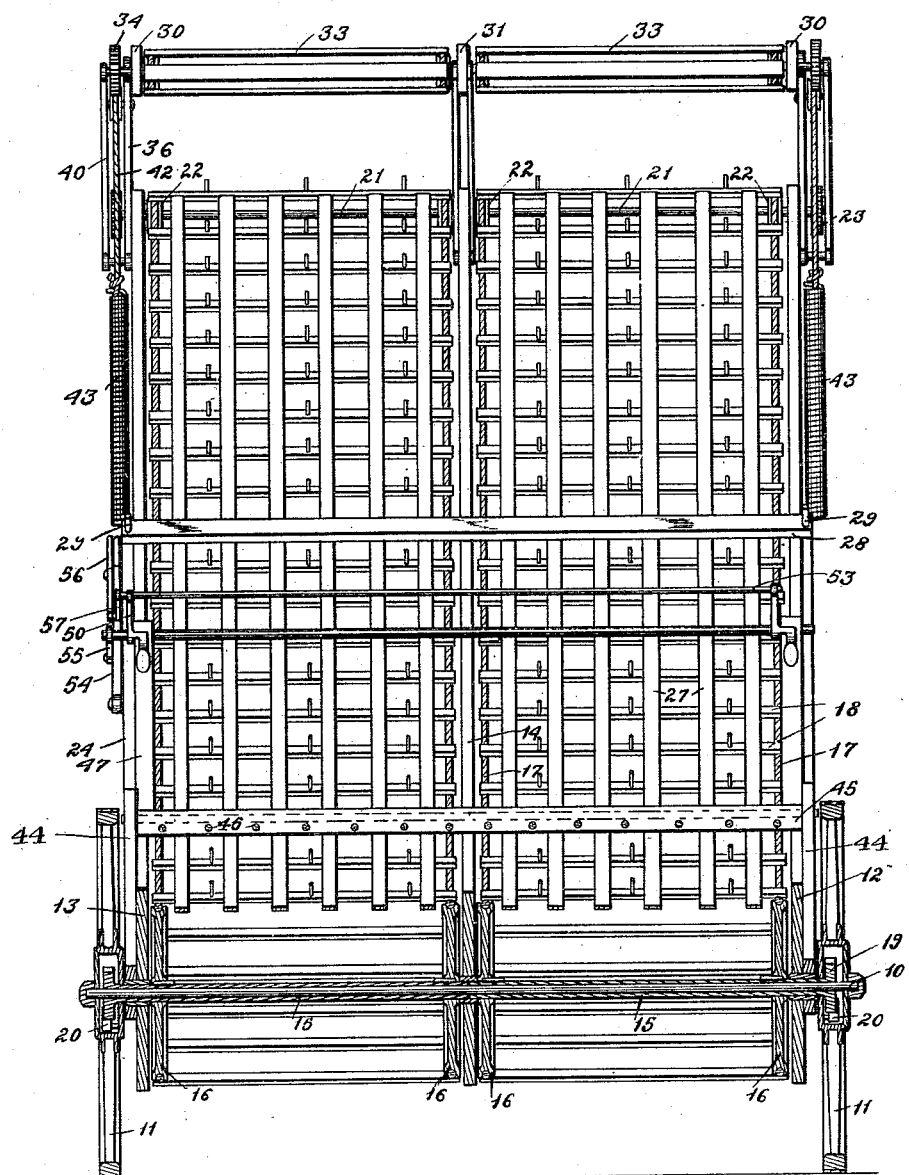

UNITED STATES PATENT OFFICE.

WILLIAM R. EVERITT, OF MUSCATINE, IOWA.

CONVEYER DEVICE FOR HAY RAKES AND LOADERS.

973,418.  Specification of Letters Patent.  Patented Oct. 18, 1910.

Application filed February 14, 1910. Serial No. 543,855.

*To all whom it may concern:*

Be it known that I, WILLIAM R. EVERITT, a citizen of the United States, residing at Muscatine, in the county of Muscatine and State of Iowa, have invented a certain new and useful Conveying Device for Hay Rakes and Loaders, of which the following is a specification.

The object of my invention is to provide conveyer devices for hay rakes and loaders of simple, durable and inexpensive construction and having two main conveyers side by side and two auxiliary conveyers side by side so arranged that the main and auxiliary conveyers on one side may move at a greater speed than those on the other side, and further to provide auxiliary conveyers so arranged that they may be moved to one position where they will discharge hay to a point at or near the center of a hay rack or they may be moved to position where they will be inoperative and hay will be delivered from the main conveyers to the rear portion of a hay rack so that the operator may deliver hay upon a hay rack at any point desired to thereby dispense with the services of a man upon the hay rack for distributing the hay.

A further object is to provide a hay rake and loader of this class in which there are two independent conveyers side by side, each being independently operated from the adjacent supporting wheel so that in turning corners one may operate and the other stand still to thereby minimize the draft of the device and prevent one of the supporting wheels from slipping.

My invention consists in certain details, in the construction, arrangement and combination of the various parts of the device whereby the objects contemplated are attained as hereinafter more fully set forth, pointed out in my claims and illustrated in the accompanying drawings, in which—

Figure 1 shows a side elevation of a complete hay rake and loader embodying my invention. The dotted lines in this figure show the position of the auxiliary conveyer when elevated, and Fig. 2 shows a rear elevation of my complete hay rake and loader, the axle of the supporting wheels and connected parts being shown in vertical section.

Referring to the accompanying drawings, I have used the reference numeral 10 to indicate the axle of the supporting wheels, and 11 the supporting wheels rotatably mounted thereon.

The frame of the main conveyer comprises two outer side pieces 12 and 13 and a central, longitudinal frame member 14. Mounted upon the rear axle are two sleeves 15 with their central portions adjacent to each other. The frame members 12 and 13 are mounted on the end portions of said sleeves and the central frame member 14 is mounted on the ends of both sleeves, as shown in Fig. 2, the sleeves being rotatably mounted within the frame members. On each of said sleeves, I have fixed two pulleys 16 designed to receive the conveyer belts 17 which are provided with the cross slats 18 of ordinary construction. Mounted on the end of each sleeve 15 is a ratchet wheel 19 and within each supporting wheel are two pawls 20 in engagement with said ratchet wheel to thereby provide means whereby the sleeves will be rotated when the supporting wheels are moved forwardly and the sleeves will not be acted on when the supporting wheels move rearwardly. The pulleys 16 on one side will be operated only by the adjacent supporting wheel and any movement imparted to the other supporting wheel will operate only the pulleys adjacent to it. At the top of the frame composed of the parts 12, 13 and 14 are two rotatable shafts 21, each of which has two pulleys 22 thereon to receive the conveyer belts 17 and also a pinion 23 at its outer end, the two shafts 21 being capable of independent movement relative to each other and being rotated by the conveyer belts. The frame members 12, 13 and 14 are supported near their central portions by the uprights 24 and their lower ends rest upon the horizontal frame member 25 which is preferably provided near its forward end with a supporting leg 26. Mounted above the conveyer belts are the longitudinal slats 27 preferably connected by a cross piece 28 which is connected to the sides 12 and 13 by means of pins 29.

The auxiliary conveyer comprises a frame consisting of two side frame members 30 and a central, longitudinal frame member 31. Within this frame member are two independent side by side slats conveyers 33, each of which has on its driving shaft a pinion 34. To support the auxiliary conveyer frame, I have provided two stationary brackets 35 on the frame members 12 and 13. Each of the brackets 35 has an upwardly extended arm 36 having a hook 37 at its upper end and a pulley 38 below the hook. Each bracket is also provided with an idler pinion 39 arranged to be constantly in mesh with the adjacent pinion 23 and also capable of being in mesh with the pinion 34 when the auxiliary conveyer frame is in the position shown in Fig. 1.

For supporting the auxiliary conveyer frame, I have provided on each side two parallel supporting arms 40, said arms each being pivoted at one end to the adjacent bracket 35, and each being pivoted at its other end to the adjacent side piece 30 of the auxiliary conveyer frame, and fixed to the side piece 30 is a stationary pin 41. Said parts are so arranged and proportioned that when the auxiliary conveyer frame is moved upwardly, as shown by dotted lines in Fig. 1, the parallel arms 40 will incline rearwardly at their upper ends before the pins 41 engage the hooks 37 which obviously limits said rearward movement.

In order to provide for conveniently and easily adjusting the position of the auxiliary conveyer frame, I have provided the following device, one for each side of the auxiliary conveyer frame: The numeral 42 indicates a rope or cable fixed to the adjacent side piece 30 and extended over the pulley 38 and connected at its rear end with a contractible coil spring 43 which extends downwardly and rearwardly and is attached to the adjacent side member of the main frame. This spring is of such length and resiliency that the weight of the auxiliary conveyer frame will hold the spring stretched when in the position shown in Fig. 1. However, a comparatively slight amount of upward pressure applied to the auxiliary conveyer frame will, with the assistance of the spring, be sufficient to bodily elevate the auxiliary conveyer frame and to move it to position shown in by dotted lines in said figure and when in this position the spring will tend to hold it against forward movement. However, it may be moved forwardly and downwardly by the application of a comparatively slight amount of power. The said auxiliary conveyer may be moved readily from one position to the other by an operator pressing upon it with a hay fork or by hand. When the parts are in the position shown in Fig. 1, the pins 41 will strike upon the forward one of the parallel arms 40 and thus limit the downward movement of the auxiliary conveyer frame.

The hay rake attachment comprises two stationary supporting arms 44 extended upwardly above the supporting wheel axles and having a cross piece 45 pivotally mounted therein. This cross piece has a series of ordinary spring rake teeth 46 fixed thereto. At the end portions of the cross piece 45 are two uprights 47. Mounted on the sides 12 and 13 are two segmental rods 48 extended through openings in the upper ends of the uprights 47 and mounted on each of said segmental rods is an extensible coil spring 49 designed to apply yielding pressure in a rearward direction to the uprights 47 to thereby tend to hold the lower ends of the rake teeth forwardly. By this arrangement it is obvious that if all or a greater portion of the rake teeth encounter some obstruction the rake teeth will spring to a certain extent and then the springs 49 will be compressed and the uprights 47 will move forwardly and downwardly and as soon as the obstruction has been passed the springs 49 will tend to return the rake to its normal position. In order to limit the rearward movement of the uprights 47, I have provided a shaft 50 mounted in the upper ends of the uprights 47 and on each end of said shaft is a pawl 51. An arm 52 extends upwardly from each pawl and said arms are connected by a rod 53. The rear ends of the rods 48 are notched to receive said pawls. For controlling the movement of the pawls, I have provided a lever 54 fulcrumed to one of the uprights 24 and provided with a rod 55 pivoted to its central portion and also pivoted to the adjacent end of the rod 50. I have also provided a short lever 56 fulcrumed to the lever 54 and provided with a link 57 to connect it with the adjacent end of the rod 53. By this arrangement, an operator may, by grasping the lever 54 release the pawls 51 and move the uprights 47 either forwardly or rearwardly as desired and when the operator releases the lever 54, the springs 49 will normally hold the uprights 47 to their rearward limit of movement.

In practical use, it is obvious that the device may be attached to a hay rake in the ordinary manner and assuming that it is desired to first discharge hay in the forward portion of the hay rack, the auxiliary conveyer is set to the position shown in Fig. 1. Then as the hay rack and my improved hay rake and loader are advanced over a field, hay will be gathered by the spring teeth 46 and engaged by the slatted conveyers and carried up to the conveyers in the auxiliary frame and discharged at the forward ends of the conveyers of the auxiliary frame. When the device is turning one of the supporting wheels may travel faster than the other and the conveyers on the side of the rapidly moving traction wheel will be moved faster than the other conveyers. This will prevent the supporting wheels from slipping and will minimize the draft. When the operator has filled the forward end of the hay rack, he may then grasp the auxiliary conveyer frame at any point or he may engage it with a hay fork or the like and push it upwardly whereupon the springs 43 will immediately move it to its upper limit and hold it in such position. This will allow the hay from the lower conveyers to discharge from their upper ends into the rear portion of the hay rack in the ordinary manner and the auxiliary conveyer frame is supported in position where it will not in any way interfere with the ordinary use of the hay rake and loader. However if it is desired at any time to return the auxiliary conveyer to its original position this may be done by pushing forwardly upon the auxiliary frame. The gearing devices 23, 39 and 34 are so arranged that they will be in mesh when the auxiliary conveyer frame is being used and they will drive the auxiliary conveyers in the proper direction and then when the auxiliary conveyer frame is moved upwardly the gears will disengage.

I claim as my invention:

1. In a device of the class described, the combination of a main frame, an auxiliary conveyer frame, parallel arms pivoted to each side of the main frame and also pivoted to each side of the auxiliary frame, a rope or cable fixed to the auxiliary conveyer frame, an elevated support for same and a contractible spring connected to the rope or cable and also the main frame, and means for limiting the rearward movement of the auxiliary conveyer frame, for the purposes stated.

2. In a device of the class described, the combination of a main frame, an auxiliary conveyer frame, parallel arms pivoted to each side of the main frame and also pivoted to each side of the auxiliary frame, a rope or cable fixed to the auxiliary conveyer frame, an elevated support for same, a contractible spring connected to the rope or cable and also to the main frame, means for limiting the rearward movement of the auxiliary conveyer frame, a conveyer in the main frame, a conveyer in the auxiliary frame, a pinion operatively connected with each of said conveyers, and a third pinion normally in mesh with the pinion of the main conveyer and in position to mesh with the pinion of the auxiliary conveyer when the latter is in its position adjacent to the delivery end of the main conveyer, for the purposes stated.

3. In a device of the class described, the combination of a main conveyer frame, two independent conveyers arranged therein side by side and provided with toothed cross slats, independent means for operating said conveyers, an auxiliary conveyer frame, parallel arms pivoted to each side of the main frame and also pivoted to each side of the auxiliary frame, a rope or cable fixed to the auxiliary conveyer frame, an elevated support for it on the main conveyer frame, a spring connected to the rope or cable and also to the main conveyer frame, means for limiting the rearward movement of the auxiliary conveyer frame, two independent conveyers in the auxiliary conveyer frame arranged side by side, and gearing devices on each side of the main and auxiliary conveyer frames for driving the auxiliary conveyers by power from the conveyers on the main frame, said gearing devices being thrown out of gear when the auxiliary conveyer frame is elevated, for the purposes stated.

Des Moines, Iowa, Feb. 3, 1910.

WILLIAM R. EVERITT.

Witnesses:
POWELL D. SOWERS,
ORVAL E. MONGERSON.